US009571857B2

(12) United States Patent
Vo et al.

(10) Patent No.: US 9,571,857 B2
(45) Date of Patent: Feb. 14, 2017

(54) METHODS AND APPARATUS FOR VIDEO IMAGING PRUNING

(75) Inventors: Dung Trung Vo, La Jolla, CA (US); Joel Sole, Plainsboro, NJ (US); Peng Yin, Ithaca, NY (US); Yunfei Zheng, Plainsboro, NJ (US)

(73) Assignee: THOMSON LICENSING, Moulineaux (FR)

( * ) Notice: Subject to any disclaimer, the term of this patent is extended or adjusted under 35 U.S.C. 154(b) by 495 days.

(21) Appl. No.: 12/998,123

(22) PCT Filed: Sep. 1, 2009

(86) PCT No.: PCT/US2009/004950
§ 371 (c)(1),
(2), (4) Date: Mar. 18, 2011

(87) PCT Pub. No.: WO2010/033151
PCT Pub. Date: Mar. 25, 2010

(65) Prior Publication Data
US 2011/0170615 A1 Jul. 14, 2011

Related U.S. Application Data

(60) Provisional application No. 61/098,125, filed on Sep. 18, 2008.

(51) Int. Cl.
*G06K 9/36* (2006.01)
*H04N 19/59* (2014.01)
(Continued)

(52) U.S. Cl.
CPC ............ *H04N 19/59* (2014.11); *H04N 19/587* (2014.11); *H04N 19/85* (2014.11)

(58) Field of Classification Search
CPC ........ H04N 7/46; H04N 7/50; H04N 7/26941; H04N 21/2365; H04N 21/4347; H04N 7/26244; H04N 19/587; H04N 19/59; H04N 19/85
(Continued)

(56) References Cited

U.S. PATENT DOCUMENTS 5,293,434 A * 3/1994 Feig et al. .................... 382/234
5,764,800 A * 6/1998 Yamagata .................... 382/232
(Continued)

FOREIGN PATENT DOCUMENTS

CN 1894957 A 1/2007
CN 101068333 A 11/2007
(Continued)

OTHER PUBLICATIONS

Morrison et al, Reduction of the bit-rate of compressed video while in its coded form, 1994.*
(Continued)

*Primary Examiner* — Shan Elahi
(74) *Attorney, Agent, or Firm* — Brian Dorini; Ronald J. Kolczynski

(57) ABSTRACT

Methods and apparatus are provided for video image pruning. An apparatus includes a data pruner for pre-processing a picture prior to, and in preparation for, compression by encoding. The data pruner selectively removes, in the spatial domain, at least one region within the picture. At the decoder end, an apparatus includes a data restorer for receiving a decompressed picture subsequent to decompression by decoding, and post-processing the decompressed picture by selectively restoring, in the spatial domain, at least one region in the decompressed picture based on information indicating a removal of the at least one region prior to a previously performed encoding process.

35 Claims, 10 Drawing Sheets

(51) Int. Cl.
*H04N 19/587* (2014.01)
*H04N 19/85* (2014.01)

(58) Field of Classification Search
USPC .................................................. 375/240.26
See application file for complete search history.

(56) References Cited

U.S. PATENT DOCUMENTS

| | | | | |
|---|---|---|---|---|
| 5,867,602 | A * | 2/1999 | Zandi et al. | 382/248 |
| 5,881,176 | A * | 3/1999 | Keith et al. | 382/248 |
| 5,928,313 | A * | 7/1999 | Thompson | 708/313 |
| 5,933,193 | A * | 8/1999 | Niesen | 375/240.12 |
| 5,966,465 | A * | 10/1999 | Keith et al. | 382/232 |
| 5,995,923 | A * | 11/1999 | Mermelstein et al. | 704/219 |
| 6,104,753 | A * | 8/2000 | Kim et al. | 375/240.15 |
| 6,181,825 | B1 | 1/2001 | Ragland et al. | 382/239 |
| 6,195,394 | B1 * | 2/2001 | Arbeiter et al. | 375/240.29 |
| 6,195,465 | B1 * | 2/2001 | Zandi et al. | 382/248 |
| 6,259,741 | B1 * | 7/2001 | Chen et al. | 375/240.26 |
| 6,625,322 | B1 * | 9/2003 | Kondo et al. | 382/239 |
| 6,919,892 | B1 * | 7/2005 | Cheiky et al. | 345/473 |
| 7,046,854 | B2 * | 5/2006 | Daniell | 382/235 |
| 7,095,787 | B2 * | 8/2006 | Kadono et al. | 375/240.27 |
| 8,315,466 | B2 * | 11/2012 | El-Maleh et al. | 382/232 |
| 8,543,884 | B2 * | 9/2013 | Mansour | 714/755 |
| 2001/0029596 | A1 * | 10/2001 | Kim | H03M 13/25 714/796 |
| 2002/0064226 | A1 * | 5/2002 | Bauer et al. | 375/240.02 |
| 2003/0076888 | A1 * | 4/2003 | Daniell | 375/260 |
| 2003/0118241 | A1 * | 6/2003 | Zandi et al. | 382/240 |
| 2003/0123743 | A1 * | 7/2003 | Zandi et al. | 382/240 |
| 2003/0169936 | A1 * | 9/2003 | Zandi et al. | 382/240 |
| 2003/0177004 | A1 * | 9/2003 | Jabri et al. | 704/219 |
| 2003/0202604 | A1 * | 10/2003 | Brightwell et al. | 375/240.25 |
| 2004/0008790 | A1 * | 1/2004 | Rodriguez | 375/240.26 |
| 2004/0066972 | A1 * | 4/2004 | Sato et al. | 382/236 |
| 2004/0130680 | A1 * | 7/2004 | Zhou et al. | 352/38 |
| 2004/0153307 | A1 * | 8/2004 | Tishby | G06F 17/2775 704/4 |
| 2004/0161158 | A1 * | 8/2004 | Kondo et al. | 382/239 |
| 2004/0213345 | A1 * | 10/2004 | Holcomb et al. | 375/240.03 |
| 2005/0027517 | A1 * | 2/2005 | Jabri et al. | 704/219 |
| 2006/0008003 | A1 * | 1/2006 | Ji | H04N 19/63 375/240.11 |
| 2006/0008038 | A1 * | 1/2006 | Song | H04N 19/63 375/350 |
| 2006/0033936 | A1 * | 2/2006 | Lee et al. | 358/1.2 |
| 2006/0239360 | A1 * | 10/2006 | Kadono et al. | 375/240.27 |
| 2007/0106711 | A1 * | 5/2007 | Buros | G06F 17/30563 |
| 2007/0112876 | A1 * | 5/2007 | Blaisdell | G06F 17/30563 |
| 2007/0112889 | A1 * | 5/2007 | Cook | G06F 17/30412 |
| 2007/0127824 | A1 * | 6/2007 | Luo | G06K 9/00369 382/224 |
| 2007/0195194 | A1 | 8/2007 | Op De Beeck | |
| 2007/0198906 | A1 * | 8/2007 | Knee | 714/803 |
| 2007/0258012 | A1 | 11/2007 | Miller | |
| 2008/0043832 | A1 * | 2/2008 | Barkley | H04N 21/23432 375/240 |
| 2008/0049843 | A1 * | 2/2008 | Kadono et al. | 375/240.24 |
| 2008/0085058 | A1 * | 4/2008 | Cai | H04N 19/13 382/247 |
| 2008/0112648 | A1 | 5/2008 | Hatano | |
| 2008/0120676 | A1 * | 5/2008 | Morad et al. | 725/127 |
| 2008/0130742 | A1 * | 6/2008 | Scheuermann | H04N 21/2368 375/240.02 |
| 2008/0184118 | A1 * | 7/2008 | Yun et al. | 715/719 |
| 2009/0135914 | A1 * | 5/2009 | Sato et al. | 375/240.16 |
| 2009/0274380 | A1 * | 11/2009 | Wedi | 382/233 |
| 2009/0299990 | A1 * | 12/2009 | Setlur | G06F 17/30265 |
| 2010/0226432 | A1 * | 9/2010 | Wittmann | H04N 19/523 375/240.12 |

FOREIGN PATENT DOCUMENTS

| | | | |
|---|---|---|---|
| CN | 101184143 A | 5/2008 | |
| EP | 1401211 | 3/2004 | |
| EP | 1401211 A2 * | 3/2004 | ............... H04N 7/30 |
| JP | 4233884 | 8/1992 | |
| JP | 07-177507 | 7/1995 | |
| JP | 9037243 | 2/1997 | |
| JP | 10191353 | 7/1998 | |
| JP | 2001359096 | 12/2001 | |
| JP | 2004-007834 | 1/2004 | |
| JP | 2004266794 | 9/2004 | |

OTHER PUBLICATIONS

Wu et al, An Improved Visula Pruning Algorithm for Perceptually Lossless Medical Image Coding, 2005.*

Fatemi et al, Bit-Rate Reduction of MPEG Compressed Video, 2002.*

DeHaan et al., "Deinterlacing—An Overview," Proceedings of the IEEE, New York, US, vol. 86, No. 9, Sep. 1, 1998, pp. 1839-1857.

Einarsson et al., "Mixed Resolution Video Coding for Low Bit-Rate Channels," Proceedings of the Int'l. Workshop on Coding Techniques for Very Low Bit Rate Video, VLBV97, Jul. 28, 1997, pp. 77-80.

Vo et al., "Data pruning-based compression using high order edge-directed interpolation," IEEE Int'l. Conference on Acoustics, Speech and Signal Processing 2009, ICASSP 2009, IEEE, Piscataway, NJ, US, Apr. 19, 2009, pp. 997-1000.

Cavallaro et al., "Perceptual Prefiltering for Video Coding", Proceedings of 2004 International Symposium on Intelligent Multimedia, Video and Speech Processing, Hong Kong, Oct. 20-22, 2004.

Cha et al., "Edge-Forming Methods for Color Image Zooming", IEEE Transactins on Image Processing, vol. 15, No. 8, Aug. 2006.

Itu H.264, "Series H: Audiovisual and Multimedia Systems Infrastructure of Audiovisual services—Coding of Moving Vehicle", Advanced Video Coding for Generic Audiovisual Services, International Telecommunication Union, Mar. 2005.

Li et al., "Markov Random Field Model-Based Edge-Directed Image Interpolation", IEEE Transactions on Image Processing, vol. 17, No. 7, Jul. 2008.

Li et al., "New Edge-Directed Interpolation", IEEE Transactions on Image Processing, vol. 10, No. 10, Oct. 2001.

Mueller et al., "Image Interpolation Using Multiscale Geometric Representations," Computational Imaging, San Jose, CA, vol. 6498, Jan. 29-31, 2007, 11 pages.

Nguyen et al., "Adaptive Downsampling/Upsampling for Better Video Compression at Low Bit Rate," 2008 IEEE Int'l. Symposium on Circuits and Systems (ISCAS '08), May 18-21, 2008.

Ratakonda et al., "POCS Based Adaptive Image Magnification," Proceedings of 1998 Int'l. Conference on Image Processing, ICIP '98, Oct. 4-7, 1998, IEEE, vol. 3, pp. 203-207.

Vasconcelos et al., "Pre and Post-Filtering for Low Bit-Rate Video Coding," Proceedings of 1997 Int'l. Conference on Image Processing (ICIP '97), IEEE Computer Society, Washington, DC, 3 Volume set, vol. 1, 4 pages.

Zhang et al., "An Edge-Guided Image Interpolation Algorithm via Directional Filtering and Data Fusion", IEEE Transactions on Image Processing, vol. 15, No. 8, Aug. 2006.

Avidan et al.: "Seam Carving for Content-Aware Image Resizing," ACM Transactions on Graphics, vol. 26, No. 3, Article 10, Jul. 2007, pp. 10-1 to 10-9.

Rubinstein et al.: "Improved Seam Carving for Video Retargeting," ACM Transactions on Graphics, vol. 27, No. 3, Article 16, Aug. 2008, pp. 16:1-16:9.

* cited by examiner

METHODS AND APPARATUS FOR VIDEO IMAGING PRUNING

CROSS-REFERENCE TO RELATED APPLICATIONS

This application claims the benefit, under 35 U.S.C. §365 of International Application PCT/US2009/004950 and filed Sep. 1, 2009, which was published in accordance with PCT Article 21(2) on Mar. 25, 2010, in English, and which claims the benefit of U.S. Provisional Patent Application No. 61/098,125, filed on Sep. 18, 2008, in English, which are incorporated by reference in their respective entireties.

TECHNICAL FIELD

The present principles relate generally to video encoding and decoding and, more particularly, to methods and apparatus for video image pruning.

BACKGROUND

Currently, requests for higher quality video are ever increasing. Video content demands tend to go to higher resolution, higher frame-rate, and higher bit-depth. To combat the bit-rate increase corresponding to high definition (HD) video and other bit rate intensive developments, especially to meet the transmission constraint of network and communication techniques, new technologies to further reduce bit-rate are strongly demanded.

There are at least two basic approaches to reducing compression bit rate. The first approach involves improving compression technology, and the second approach involves performing some sort of preprocessing prior to compression.

With respect to the first approach, namely improving compression technology, the progression of the same can be readily seen in the development of the various Moving Picture Experts Group video coding standards, such as, for example, the International Organization for Standardization/International Electrotechnical Commission (ISO/IEC) MPEG-1 Standard, the ISO/IEC MPEG-2 Standard, the ISO/IEC MPEG-4 Standard, and the ISO/IEC MPEG-4 Part 10 Advanced Video Coding (AVC) Standard/International Telecommunication Union, Telecommunication Sector (ITU-T) H.264 Recommendation (hereinafter the "MPEG-4 AVC Standard").

For most video coding standards, increasing the quantization step size is a means used to reduce the bit-rate. However, this technique can result in severe blocky artifacts and other coding artifacts due to the loss of high frequency details.

With respect to the second approach, namely performing some sort of preprocessing prior to compression, the goal of such preprocessing is to remove the information that is least important in terms of visual perception, or the information that is able to be recovered after the decoding process without significantly altering the content. This bit rate reduction is also commonly referred to as data pruning. Some common techniques to perform this bit rate reduction through data pruning are the use of low-pass filters and down-sampling (which can be seen as a filtering process), followed by an up-sampling at the decoder. One effect of these schemes is that the decoded and reconstructed video looks a bit blurry since these techniques are designed to eliminate high frequency information in the video in order to reduce the bit-rate.

As for interpolation which, for example, can be used for the previously described upsampling, a wide range of interpolation methods and schemes have been discussed and developed, beginning with conventional bilinear and bi-cubic interpolation and continuing to sophisticated iterative interpolation methods such as projection onto convex sets (POCS) and non-convex nonlinear partial differential equations.

To avoid the jerkiness occurring along edges, edge-oriented interpolation methods using a Markov random field and covariance of the low resolution image have been proposed.

One prior art approach employs a combination of directional filtering and data fusion to estimate the missing high resolution (HR) pixels by a linear minimum mean square error (LMMSE). Another group of interpolation algorithms predict the fine structure of the FIR image from its corresponding low resolution (LR) image using different kinds of transforms such as the wavelet transform or the countourlet transform.

Each of the above methods are suitable for up-sampling the same ratio in both horizontal and vertical directions; that is, in a fixed and regular data grid (i.e., all data points are found in a rectangular grid). However, when interpolation is used along with data pruning, flexibility is desired in order to adapt to the discarded data and to adjust to the varying surroundings of each pixel to achieve the best performance.

SUMMARY

These and other drawbacks and disadvantages of the prior art are addressed by the present principles, which are directed to methods and apparatus for video image data pruning.

According to an aspect of the present principles, there is provided an apparatus. The apparatus includes a data pruner for pre-processing a picture prior to, and in preparation for, compression by encoding. The data pruner selectively removes, in the spatial domain, at least one region within the picture.

According to another aspect of the present principles, there is provided a method. The method includes pre-processing a picture prior to, and in preparation for, compression by encoding. The pre-processing step includes selectively removing, in the spatial domain, at least one region within the picture using a data pruner having a processor.

According to still another aspect of the present principles, there is provided an apparatus. The apparatus includes a data restorer for receiving a decompressed picture subsequent to decompression by decoding, and post-processing the decompressed picture by selectively restoring, in the spatial domain, at least one region in the decompressed picture based on information indicating a removal of the at least one region prior to a previously performed encoding process.

According to a further aspect of the present principles, there is provided a method. The method includes receiving a decompressed picture subsequent to decompression by decoding. The method further includes post-processing, using a data restorer having a processor, the decompressed picture by selectively restoring, in the spatial domain, at least one region in the decompressed picture based on information indicating a removal of the at least one region prior to a previously performed encoding process.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
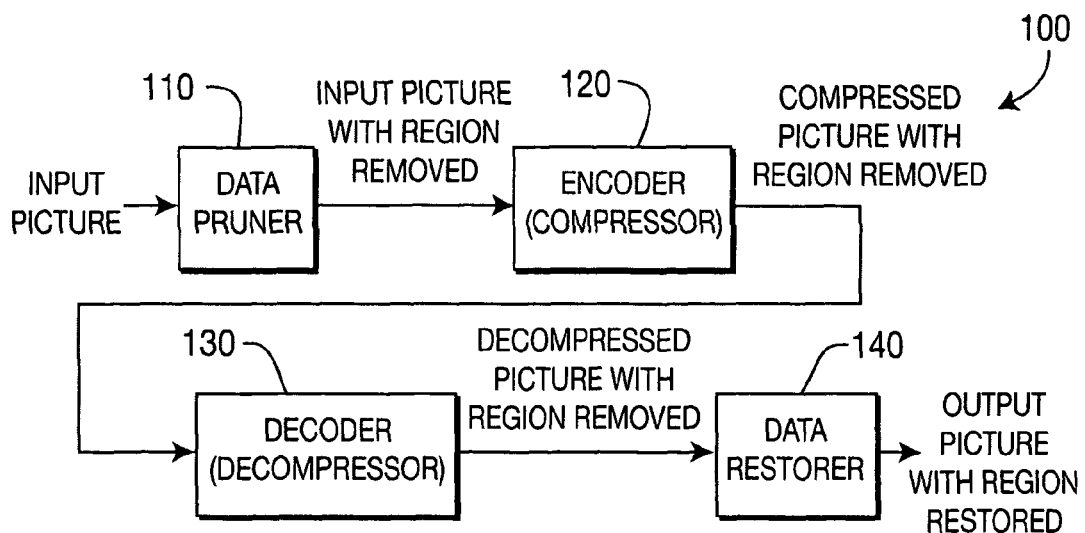
FIG. 1 is a block diagram showing an exemplary system for data pruning and restoration, in accordance with an embodiment of the present principles.

The present principles are directed to methods and apparatus for video image data pruning.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As used herein, the terms image and picture are used interchangeably, and may refer to any of video pictures that are part of a video sequence and/or still images.

As noted above, the present principles are directed to methods and apparatus for video image data pruning.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles.

Turning to FIG. 1, an exemplary system for data pruning and restoration is indicated generally by the reference numeral 100. The system 100 includes a data pruner 110, an encoder (or compressor) 120, a decoder (or decompressor) 130, and a data restorer 140. The data pruner 110 performs pre-processing to remove, in the spatial domain, at least one region (e.g., a line, curve, region, etc.) from a picture prior to compression by encoding. The encoder 120 then codes the picture with the at least one region removed. The decoder 130 decodes the coded picture with the at least one region removed. The data restorer 140 performs post-processing to restore, in the spatial domain, the at least one region to the decoded picture. Any of the data pruner 110, the encoder 120, the decoder 130, and the data restorer 140 may include, for example, one or more processors, memory, and so forth, in order to perform their corresponding functions. For example, at least one or more processors in the data pruner 110 may perform the pre-processing described herein, while one or more processors in the data restorer 140 may perform the post-processing described herein. It is to be appreciated that the data pruner 110 may include other elements which, in some embodiments, may be separate from the data pruner, while in other embodiments may be integrated with the data pruner. For example, in an embodiment, the data pruner 110 (or a data pruning phase) may include a decimator and an interpolator (see, e.g., FIG. 11). In another embodiment, the data pruner 110 (or a data pruning phase) may include a data pruner (as a sub-element that performs the actual removal of the at least one region), a store or compressor, and an interpolator (see, e.g., FIG. 10). These and other variations of the elements of FIG. 1 are readily contemplated by one of ordinary skill in this and related arts, while maintaining the spirit of the present principles.

Figure 2:
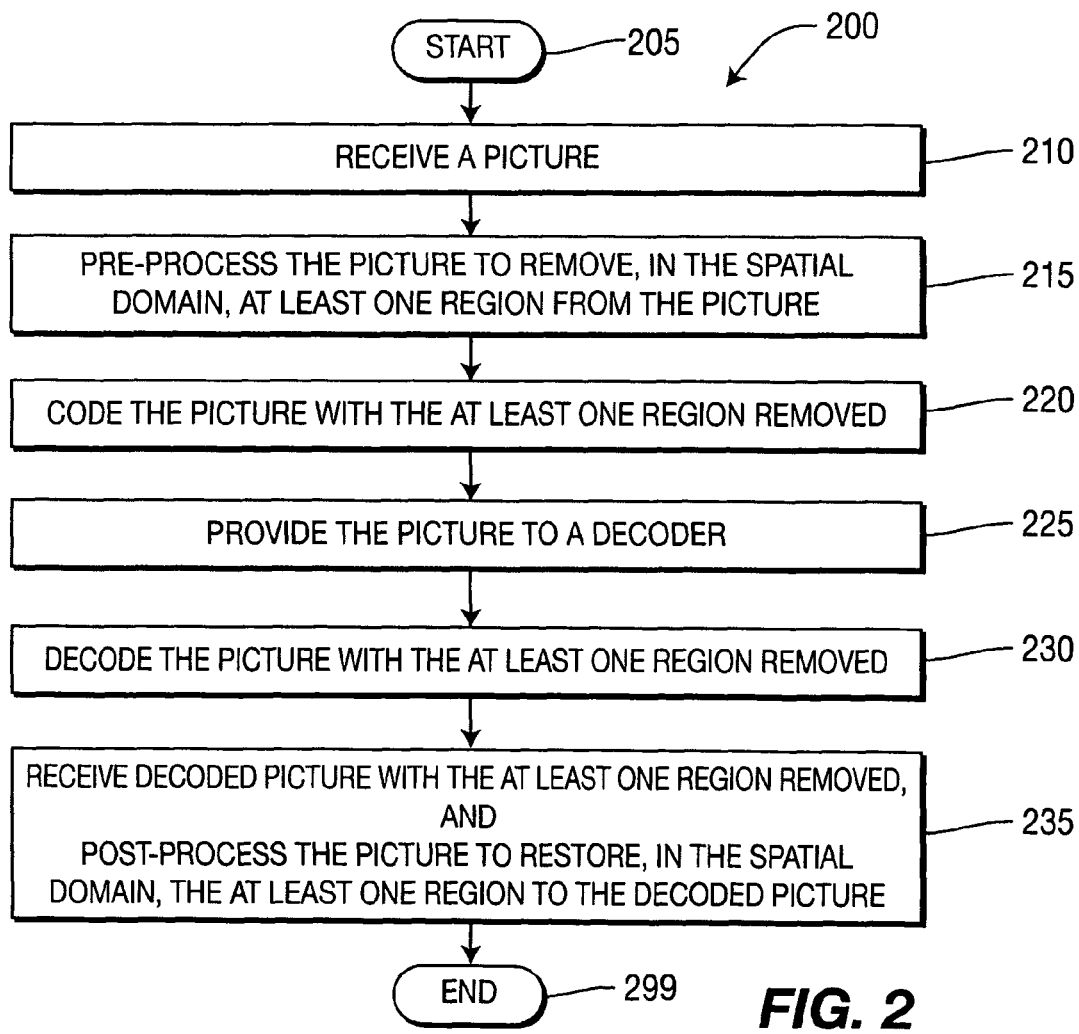
FIG. 2 is a flow diagram showing an exemplary method for data pruning and restoration, in accordance with an embodiment of the present principles.

Turning to FIG. 2, an exemplary method for data pruning and restoration is indicated generally by the reference numeral 200. The method 200 includes a start block 205 that passes control to a function block 210. The function block 210 receives a picture, and passes control to a function block 215. The function block 215 performs pre-processing of the picture to remove, in the spatial domain, at least one region (e.g., a line, curve, region, etc.) from the picture, and passes control to a function block 220. The function block 220 codes the picture with the at least one region removed, and passes control to a function block 225. The function block 225 provides (e.g., transmits) the coded picture to a decoder (or a device having a decoder), and passes control to a function block 230. The function block 230 decodes the coded picture with the at least one region removed, and passes control to a function block 225. The function block 235 receives the decoded picture with the at least one region removed, performs post-processing to restore, in the spatial domain, the at least one region to the decoded picture, and passes control to an end block 299.

Figure 3:
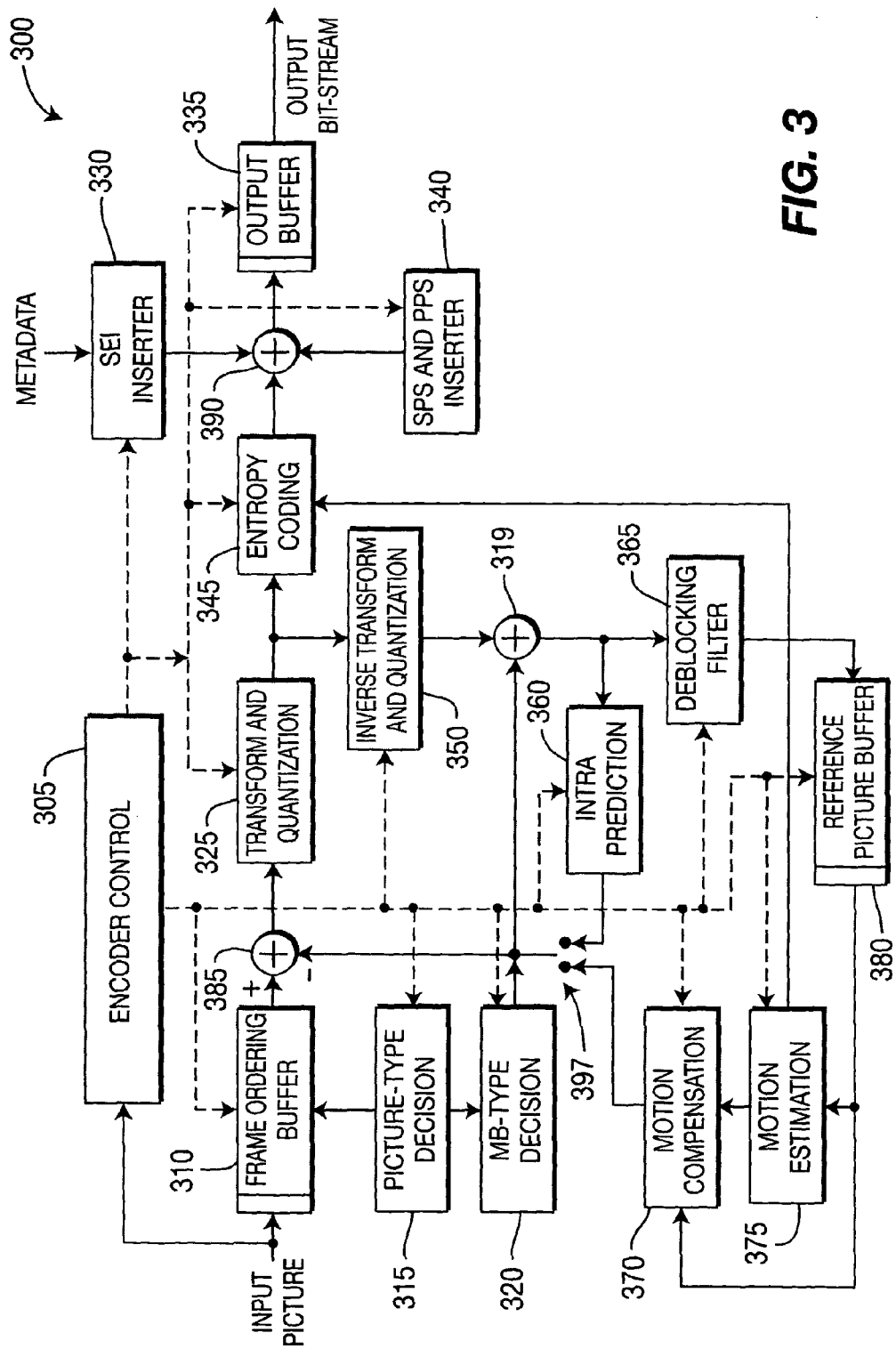
FIG. 3 is a block diagram showing an exemplary video encoder to which the present principles may be applied, in accordance with an embodiment of the present principles.

Turning to FIG. 3, an exemplary video encoder to which the present principles may be applied is indicated generally by the reference numeral 300.

The video encoder 300 includes a frame ordering buffer 310 having an output in signal communication with a non-inverting input of a combiner 385. An output of the combiner 385 is connected in signal communication with a first input of a transformer and quantizer 325. An output of the transformer and quantizer 325 is connected in signal communication with a first input of an entropy coder 345 and a first input of an inverse transformer and inverse quantizer 350. An output of the entropy coder 345 is connected in signal communication with a first non-inverting input of a combiner 390. An output of the combiner 390 is connected in signal communication with a first input of an output buffer 335.

A first output of an encoder controller 305 is connected in signal communication with a second input of the frame ordering buffer 310, a second input of the inverse transformer and inverse quantizer 350, an input of a picture-type decision module 315, an input of a macroblock-type (MB-type) decision module 320, a second input of an intra prediction module 360, a second input of a deblocking filter 365, a first input of a motion compensator 370, a first input of a motion estimator 375, and a second input of a reference picture buffer 380.

A second output of the encoder controller 305 is connected in signal communication with a first input of a Supplemental Enhancement Information (SEI) inserter 330, a second input of the transformer and quantizer 325, a second input of the entropy coder 345, a second input of the output buffer 335, and an input of the Sequence Parameter Set (SPS) and Picture Parameter Set (PPS) inserter 340.

A first output of the picture-type decision module 315 is connected in signal communication with a third input of a frame ordering buffer 310. A second output of the picture-type decision module 315 is connected in signal communication with a second input of a macroblock-type decision module 320.

An output of the Sequence Parameter Set (SPS) and Picture Parameter Set (PPS) inserter 340 is connected in signal communication with a third non-inverting input of the combiner 390.

An output of the inverse quantizer and inverse transformer 350 is connected in signal communication with a first non-inverting input of a combiner 319. An output of the combiner 319 is connected in signal communication with a first input of the intra prediction module 360 and a first input of the deblocking filter 365. An output of the deblocking filter 365 is connected in signal communication with a first input of a reference picture buffer 380. An output of the reference picture buffer 380 is connected in signal communication with a second input of the motion estimator 375. A first output of the motion estimator 375 is connected in signal communication with a second input of the motion compensator 370. A second output of the motion estimator 375 is connected in signal communication with a third input of the entropy coder 345.

An output of the motion compensator 370 is connected in signal communication with a first input of a switch 397. An output of the intra prediction module 360 is connected in signal communication with a second input of the switch 397. An output of the macroblock-type decision module 320 is connected in signal communication with a third input of the switch 397. The third input of the switch 397 determines whether or not the "data" input of the switch (as compared to the control input, i.e., the third input) is to be provided by the motion compensator 370 or the intra prediction module 360. The output of the switch 397 is connected in signal communication with a second non-inverting input of the combiner 319 and with an inverting input of the combiner 385.

Inputs of the frame ordering buffer 310 and the encoder controller 305 are available as input of the encoder 300, for receiving an input picture 301. Moreover, an input of the Supplemental Enhancement Information (SEI) inserter 330 is available as an input of the encoder 300, for receiving metadata. An output of the output buffer 335 is available as an output of the encoder 300, for outputting a bitstream.

Figure 4:
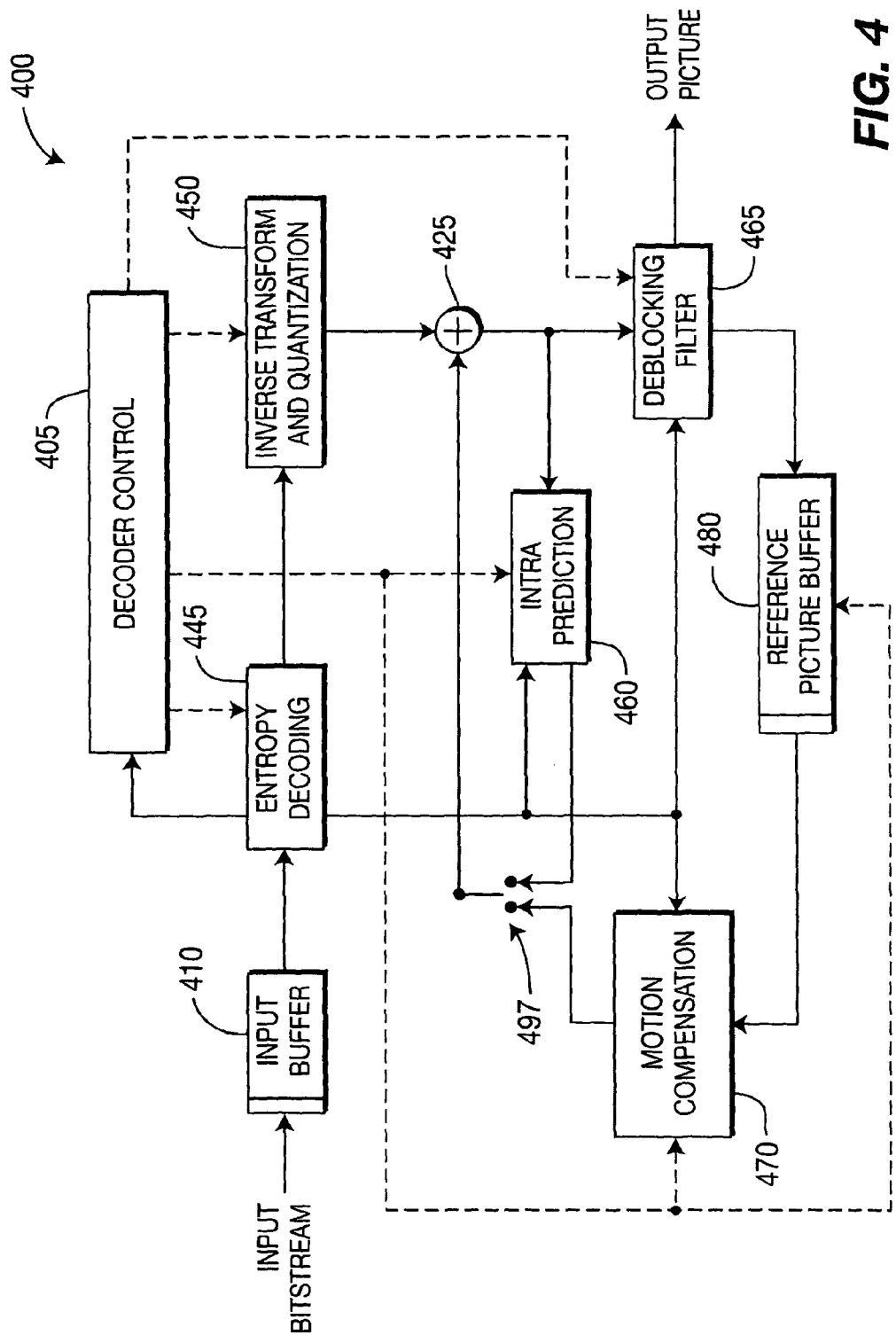
FIG. 4 is a block diagram showing an exemplary video decoder to which the present principles may be applied, in accordance with an embodiment of the present principles.

Turning to FIG. 4, an exemplary video decoder to which the present principles may be applied is indicated generally by the reference numeral 400.

The video decoder 400 includes an input buffer 410 having an output connected in signal communication with a first input of the entropy decoder 445. A first output of the entropy decoder 445 is connected in signal communication with a first input of an inverse transformer and inverse quantizer 450. An output of the inverse transformer and inverse quantizer 450 is connected in signal communication with a second non-inverting input of a combiner 425. An output of the combiner 425 is connected in signal communication with a second input of a deblocking filter 465 and a first input of an intra prediction module 460. A second output of the deblocking filter 465 is connected in signal communication with a first input of a reference picture buffer 480. An output of the reference picture buffer 480 is connected in signal communication with a second input of a motion compensator 470.

A second output of the entropy decoder 445 is connected in signal communication with a third input of the motion compensator 470 and a first input of the deblocking filter 465. A third output of the entropy decoder 445 is connected in signal communication with an input of a decoder controller 405. A first output of the decoder controller 405 is connected in signal communication with a second input of the entropy decoder 445. A second output of the decoder controller 405 is connected in signal communication with a second input of the inverse transformer and inverse quantizer 450. A third output of the decoder controller 405 is connected in signal communication with a third input of the deblocking filter 465. A fourth output of the decoder controller 405 is connected in signal communication with a second input of the intra prediction module 460, with a first input of the motion compensator 470, and with a second input of the reference picture buffer 480.

An output of the motion compensator 470 is connected in signal communication with a first input of a switch 497. An output of the intra prediction module 460 is connected in signal communication with a second input of the switch 497. An output of the switch 497 is connected in signal communication with a first non-inverting input of the combiner 425.

An input of the input buffer 410 is available as an input of the decoder 400, for receiving an input bitstream. A first output of the deblocking filter 465 is available as an output of the decoder 400, for outputting an output picture.

In accordance with the present principles, we propose a new scheme for data pruning to reduce the compressed video bit rate while, at the same time, preserving a much higher quality of the decoded and reconstructed picture at the decoder end. In further detail with respect to an embodiment, the original images/pictures are pruned to a smaller size prior to compression and then interpolated to their original size after decoding. This interpolation uses information about which lines, segments, or regions were pruned during the data pruning step to return the video image/pictures to their original size. Pruning is performed prior to encoding by dropping lines, segments, and/or regions in the spatial domain, according to one of several possible evaluation schemes and then restoring these lines, segments, and/or regions after decoding the bitstream back into the spatial domain. In an embodiment, edge-directed interpolation is utilized to reconstruct the decoded picture to its original size. Since we avoid filtering the remaining pixels in the image/video pictures, the reconstructed pictures can achieve higher quality from a lower bit-rate.

In one embodiment, data pruning is performed in a manner in which only rows or columns are dropped, so only up-sampling in one direction is needed in these areas. Although described in such a context, it would be apparent to those skilled in this and related arts that other means for dropping sections in the spatial domain may also be used prior to encoding, while maintaining the spirit of the present principles. Thus, the lines dropped may be rows or columns, but are not limited to only the preceding. For example, the lines dropped may be diagonal or may be non-linear curves instead of lines and/or in addition to lines. Furthermore, the same principles would apply and are within the scope of the present principles in that the requisite unit to be pruned is not a spatial domain line or curve, but rather a section or region. Thus, the description of the present principles provided herein in the context of lines should not so limit the scope of the invention to lines only, but to any selection of lines, curves, sections, and/or regions within the spatial domain to be dropped prior to encoding (and consequently restored after decoding). Thus, given the teachings of the present principles provided herein, these and other variations of the present principles are contemplated thereby and are readily capable of being implemented by one of ordinary skill in this and related arts, while maintaining the spirit of the present principles. It is to be appreciated that as used herein, the term "region" may represent one or more of a line, curve, section, and/or region.

Figure 5A:
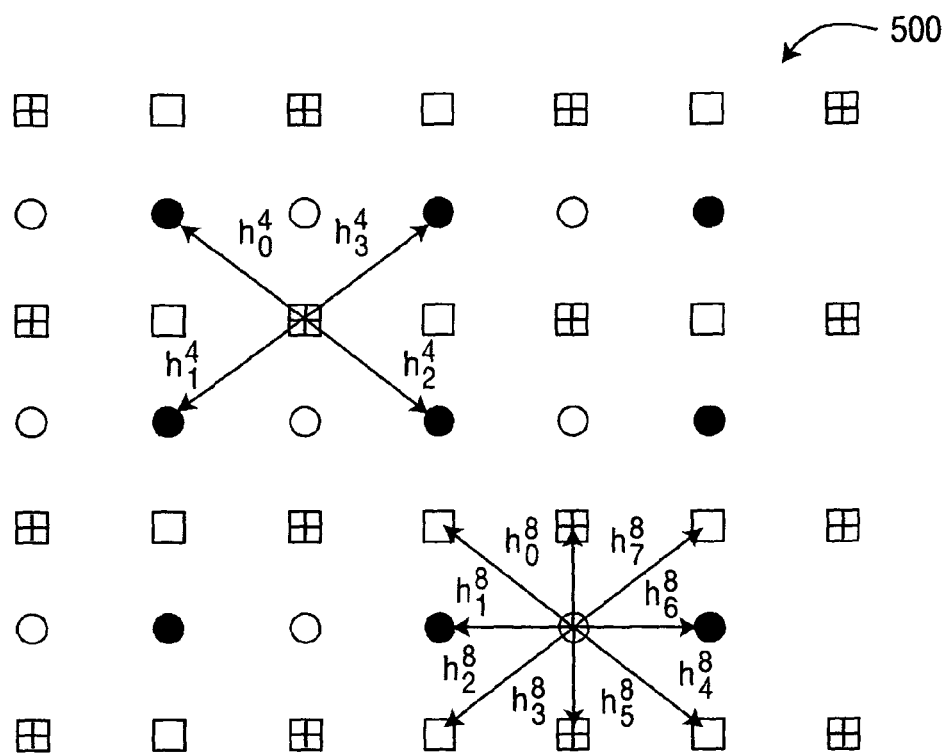
FIG. 5A is a diagram showing model parameters of high-order edge-directed interpolation relating to NEDI-4 and NEDI-8, in accordance with an embodiment of the present principles.

For illustrative purposes, we focus on how to adjust New Edge-Directed Interpolation (NEDI, specifically NEDI-4) for interpolation. Turning to FIG. 5A, model parameters of high-order edge-directed interpolation relating to NEDI-4 and NEDI-8 are indicated generally by the reference numeral 500. As shown therein, two passes are performed using the quincunx sub-lattice. In the first pass, the high resolution pixels at the cross of any four nearest low resolution pixels are interpolated from their four nearest pixels by using an adaptive fourth-order interpolator. The remaining high resolution pixels are interpolated with the same algorithm in the second pass, using the low resolution pixels and the pixels interpolated in the first pass. The high resolution model parameters of the interpolator are estimated from the lower resolution model parameters.

Data Pruning

Figure 6:
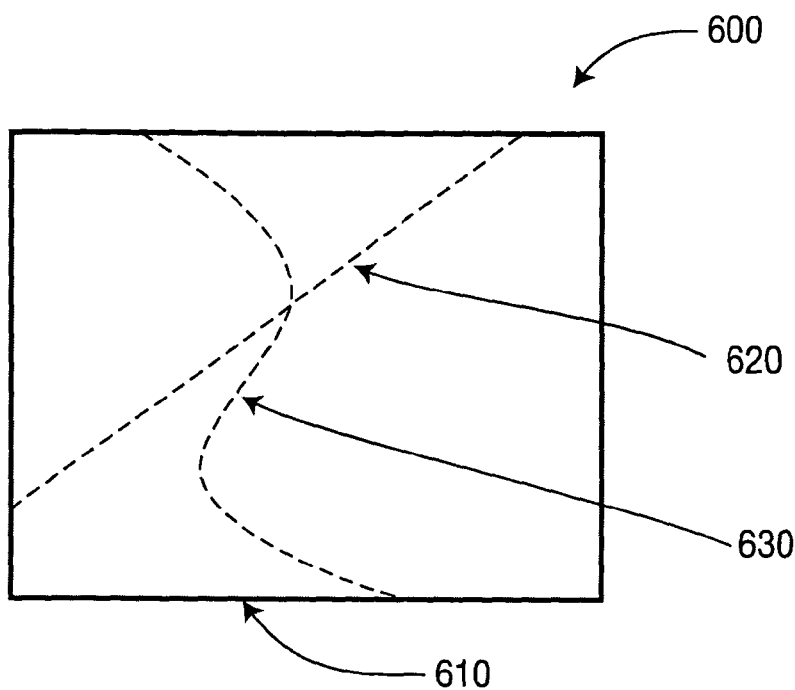
FIG. 6 is a diagram showing an example of data pruning by dropping arbitrary lines, in accordance with an embodiment of the present principles.

Data pruning is implemented by dropping lines in the pictures. A particular case would be that the line is a straight line. In that case, a line can be either a row or a column, or any straight line with direction (as seen in FIG. 6). Turning to FIG. 6, an example of data pruning by dropping arbitrary lines is indicated generally by the reference numeral 600. The data pruning 600 involves a frame 610, a pruned line 620, and a pruned curve 630.

Figure 7:
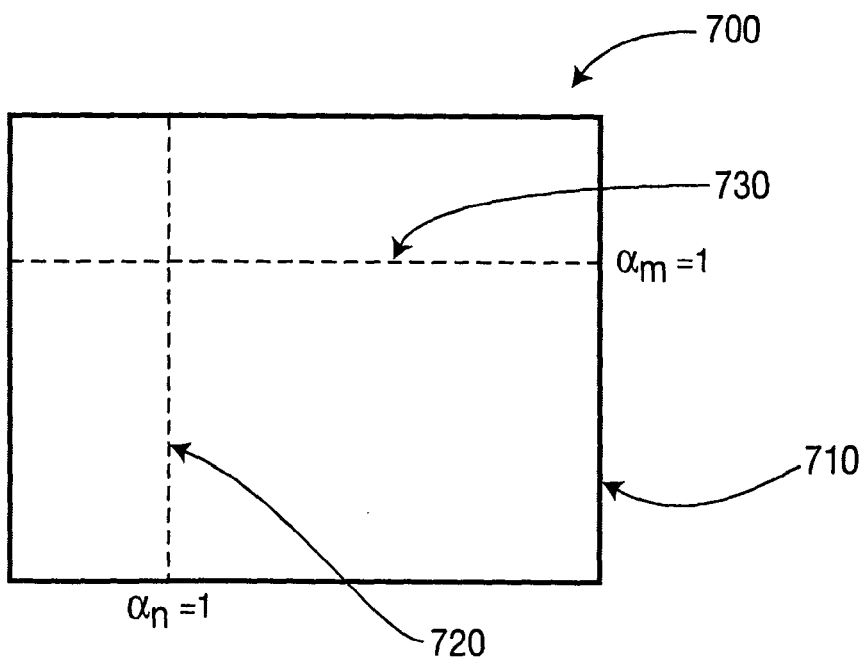
FIG. 7 is a diagram showing an example of data pruning by dropping columns and rows in one frame, in accordance with an embodiment of the present principles.

Turning to FIG. 7, an example of data pruning by dropping columns and rows in one frame is indicated generally by the reference numeral 700. The data pruning 700 involves a frame 710, a dropped column 720, and a dropped row 730.

Figure 8:
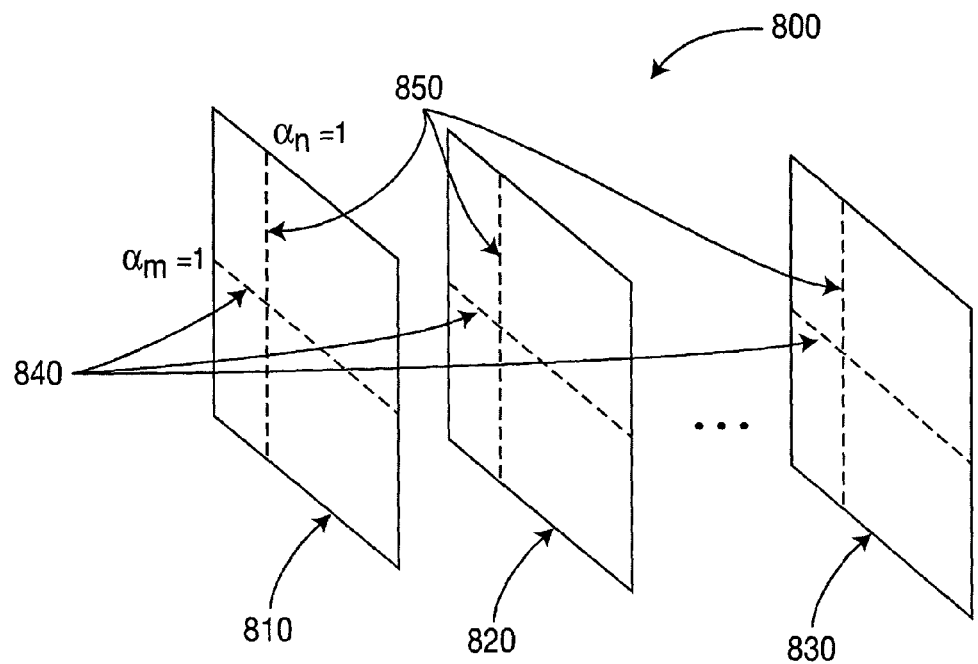
FIG. 8 is a diagram showing an example of data pruning by dropping the same columns and rows for a whole group of pictures (GOP) and/or scene, in accordance with an embodiment of the present principles.

Turning to FIG. 8, an example of data pruning by dropping the same columns and rows for a whole group of pictures (GOP) and/or scene is indicated generally by the reference numeral 800. The data pruning 800 involves a first frame 810, middle frames 820, and a last frame 830, dropped rows 840, and dropped columns 850.

Figures 9A, 9B:
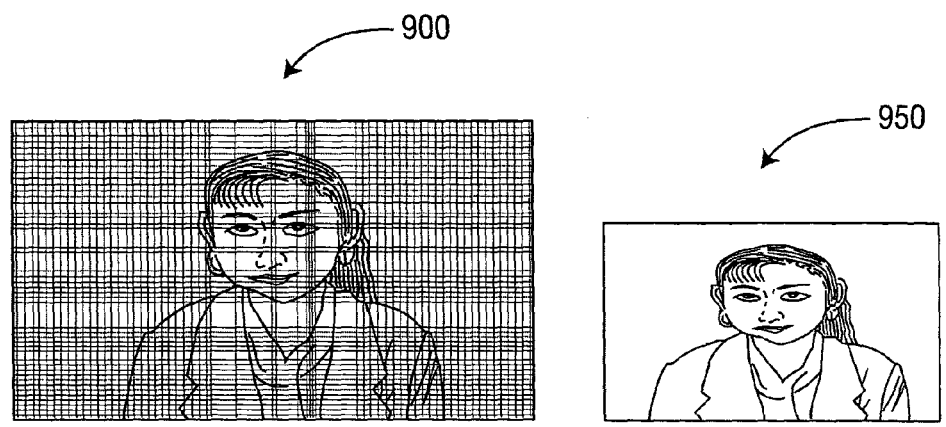
FIG. 9A is a diagram showing lines for indicating the dropped columns and rows in the first frame of the well-known Akiyo sequence, in accordance with an embodiment of the present principles.
FIG. 9B is a diagram showing the pruned frame corresponding to the example of FIG. 7A, in accordance with an embodiment of the present principles.

Turning to FIG. 9A, lines for indicating the dropped columns and rows in the first frame of the well-known Akiyo sequence are indicated generally by the reference numeral 900. Turning to FIG. 9B, the pruned frame corresponding to the example of FIG. 9A is indicated generally by the reference numeral 950.

We need to know the location of the dropped line at the decoder, because the decoder needs to interpolate the missing pixels. There is a tradeoff between signaling the location of the pixels of the dropped line and the overhead for keeping track of this dropped line. In one embodiment, we drop only columns and rows in order to significantly reduce the overhead to indicate the line. In this case, only 1 bit per row/column is used to keep track, thus indicating whether the line is dropped or not (as seen in FIG. 7 for dropping the columns and rows in one frame, in FIG. 8 for dropping the columns and rows in one GOP/scene, in FIG. 9A with white lines indicating the dropped columns and rows, and in FIG. 9B for the pruned frame). In another embodiment, we drop only odd lines and keep even lines untouched. In one embodiment, all the pictures in one GOP/scene have the same dropping patterns in order to further reduce the overhead. To decide which line is to be dropped first, in one embodiment, we assume no compression is involved and we use a distortion criterion. We first set up a final target. The target can be distortion, percentage of dropping pixels and/or any complexity constraint. Of course, given the teachings of the present principles provided herein, the target is not limited to the preceding and, thus, other targets may also be used in accordance with the present principles, while maintaining the spirit of the present principles.

In one embodiment, presuming one line is dropped, we interpolate the dropped line without considering compression. Then, we compare the MSE (Mean Square Error) of the interpolated line to the same line in the original image. The line that has the minimum MSE is selected to be dropped first. In another embodiment, we take both the distortion and the bit-rate of the line into consideration. In one embodiment, the line bit-rate can be approximated using its variance.

Optimal Data Pruning Embodiment

Figure 10:
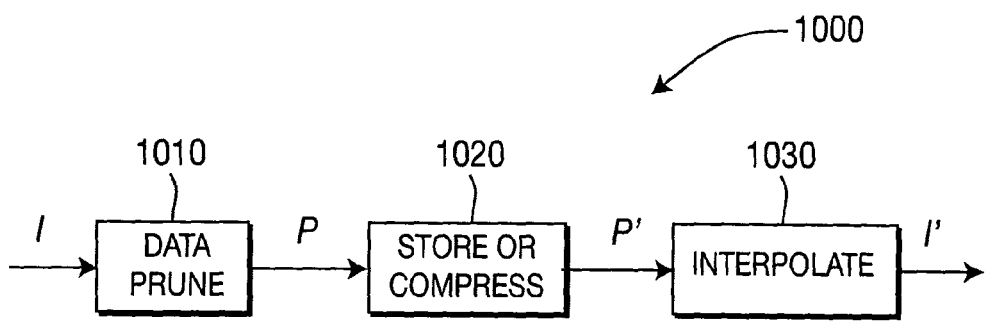
FIG. 10 is a block diagram showing an exemplary system for data pruning based compression, in accordance with an embodiment of the present principles.

Turning to FIG. 10, an exemplary system for data pruning based compression is indicated generally by the reference numeral 1000. The system 1000 includes a data pruner 1010, a data store or compressor 1020, and an interpolator 1030. While shown as separate elements, one or more of the data pruner 1010, data store or compressor 1020, or interpolator 1030 may be combined into an integrated element. For example, in an embodiment, the data pruner 1010 may be included within the data store or compressor 1020. The data store or compressor 1020 may be considered to be an encoder for the purposes of the present principles. The original frame I of size M×N is pruned to frame P of smaller size $(M-M_p) \times (M-N_p)$, where $M_p$ and $N_p$ are the number of dropped rows and columns, respectively. The purpose of data pruning is to reduce the number of bits to represent the stored or compressed frame P'. P' is then interpolated to I' to reconstruct to the original frame size. The compression stage considered here is the MPEG-4 AVC Standard codec, with the encoder as shown in FIG. 3 and the decoder as shown in FIG. 4. However, as noted above, the present principles are not limited to solely the MPEG-4 AVC Standard and, thus, may be applied to other video coding standards, recommendations, and extensions thereof, while maintaining the spirit of the present principles.

Figure 11:
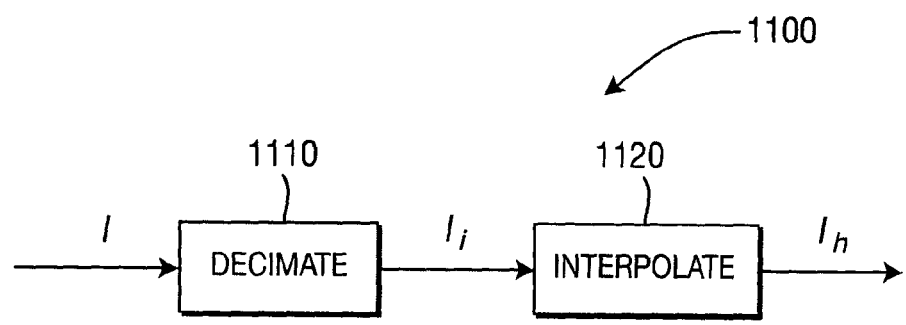
FIG. 11 is a block diagram showing an exemplary system for a data pruning phase, in accordance with an embodiment of the present principles.

Only the even rows and columns are considered to be dropped while the odd rows and columns are kept for later interpolation. Turning to FIG. 11, an exemplary system for a data pruning phase is indicated generally by the reference numeral 1100. The system 1100 includes a decimator 1110 and an interpolator 1120. In the data pruning phase, the original frame I is decimated by the decimator 1110 to the low resolution (LR) frame $I_l$ by a ratio of 1×2, 2×1 and 2×2 for the respective cases of dropping only columns, dropping only rows, and dropping both columns and rows. Then, frame I, is interpolated by the interpolator 1120 to the high resolution (HR) frame $I_h$. Due to the interpolation, the reconstructed frame is different than its original frame. The rows and columns in $I_h$ which have the least error comparing to their corresponding rows and columns in I are chosen to be dropped. The mean squared error (MSE) is defined as the mean square error between $I_h$ and I.

Given the target $MSE_{max}$, the data pruning is optimized to drop the most pixels while still keeping the overall MSE less than $MSE_{max}$. The location of the dropped rows and columns is respectively indicated by $\alpha_m$ and $\alpha_n$. The $i^{th}$ even line (row or column) is dropped if the value of $\alpha_i$ is 1; otherwise it will be kept. These indicators are stored as side information in the coded bit-stream. The mean square line error (MSLE) for one dropped line is defined as the mean square error between $I_h$ and I for pixels on that line only. Lines with a smaller MSLE have a higher priority to be dropped than lines with a higher MSLE. Presume that the $M_p$ rows and $N_p$ columns with the smallest MSLE are dropped and the maximum MSLE of these lines is $MSLE_{max}$. The overall MSE becomes the averaged MSE of all dropped pixels. An upper limit of MSE is achieved based on, for example, the number of dropped rows $M_p$, dropped columns $N_p$, and $MSLE_{max}$. This upper limit should be less than $MSE_{max}$ as the condition to find the optimal data pruning scheme.

Figure 12A:
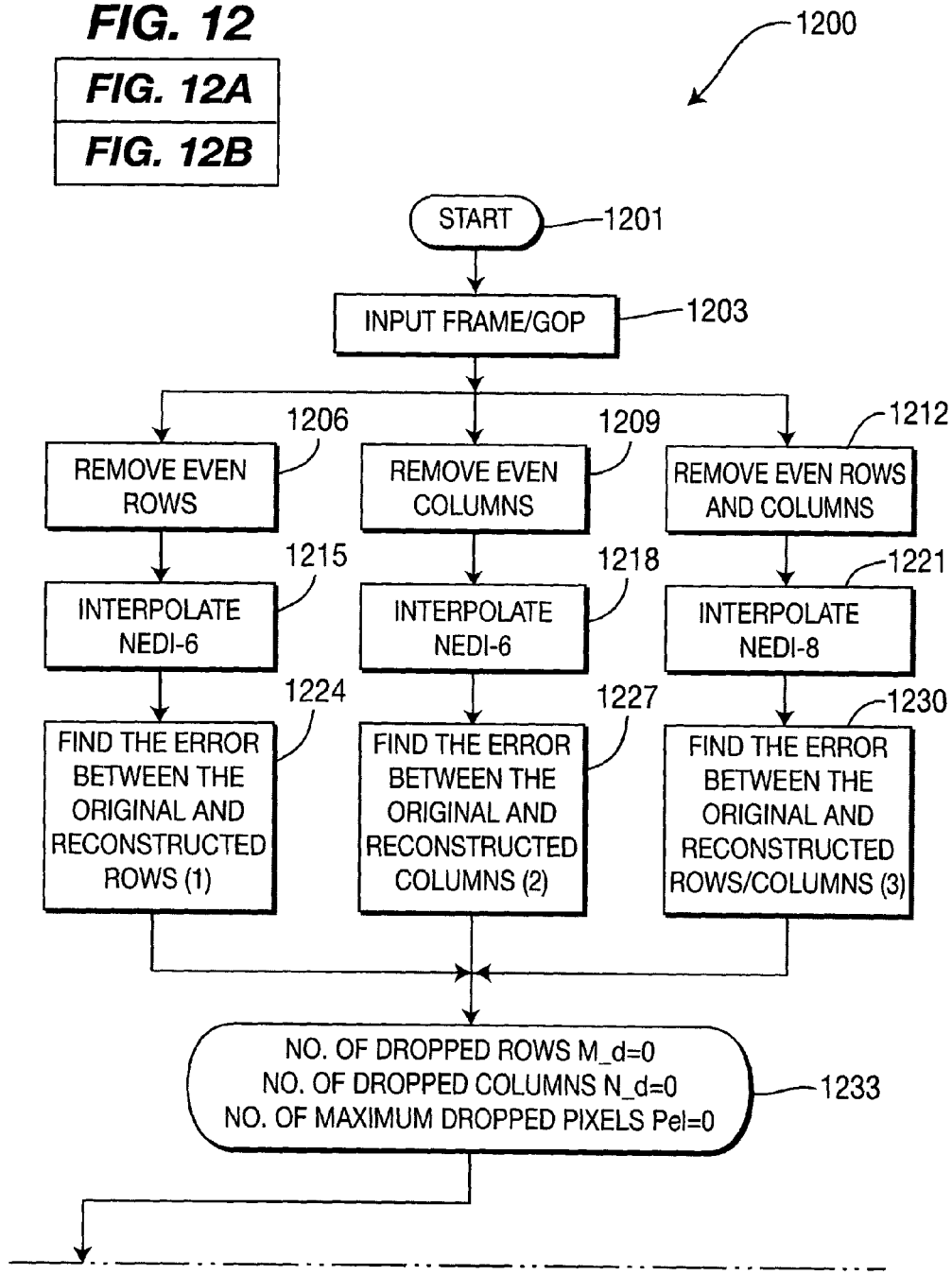
FIG. 12 is a flow diagram showing an exemplary method for optimal data pruning, in accordance with an embodiment of the present principles.
Figure 12B:
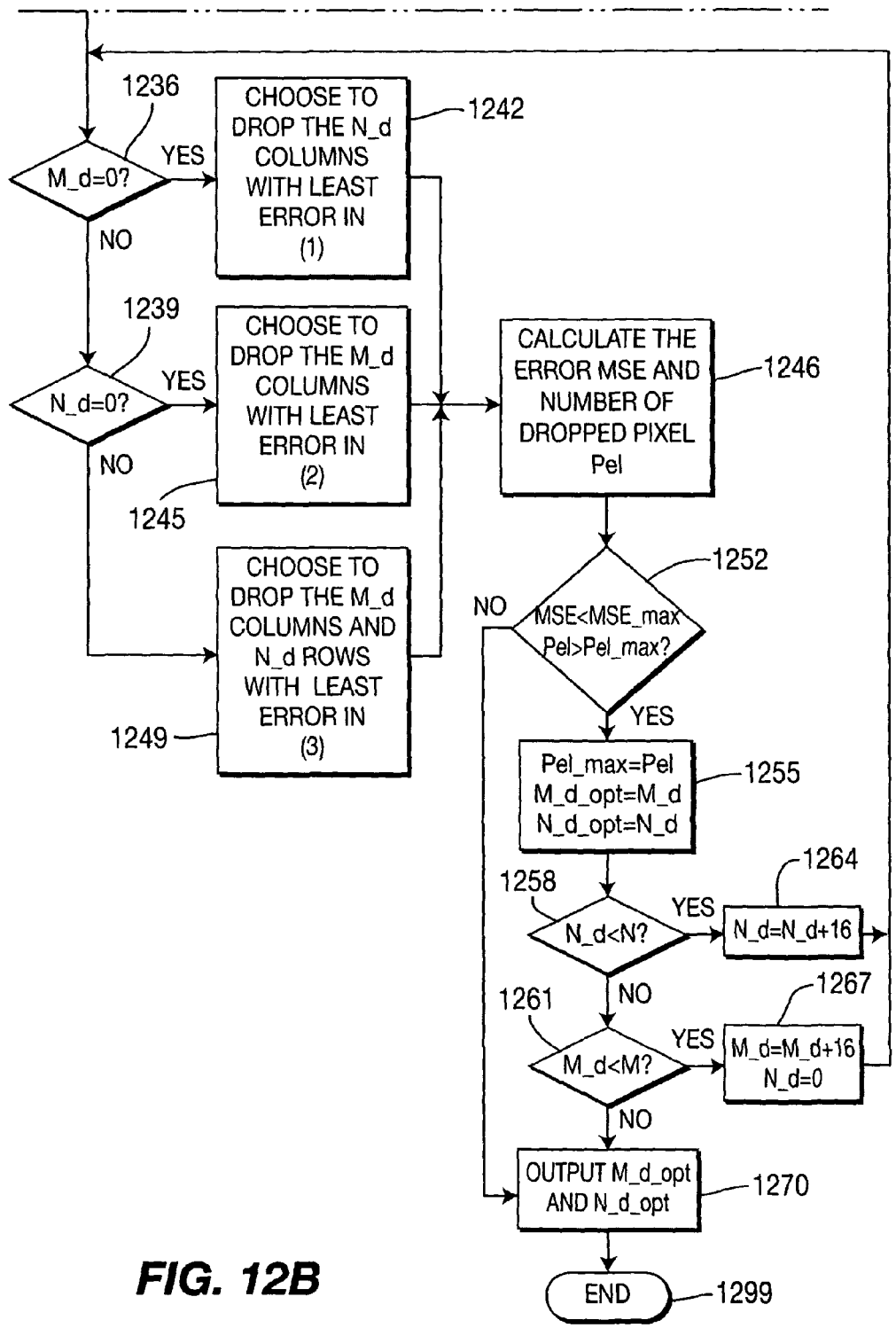

Turning to FIG. 12, an exemplary method for optimal data pruning is indicated generally by the reference numeral 1200. The method 1200 includes a start block 1201 that passes control to a function block 1203. The function block 1203 inputs a frame or GOP, and passes control to a function block 1206, a function block 1209, and a function block 1212. The function block 1206 removes the even rows, and passes control to a function block 1015. The function block 1215 performs interpolation based on, for example, NEDI-6, and passes control to a function block 1224. The function block 1224 finds the error between the original and reconstructed rows (1), and passes control to a function block 1233.

The function block 1209 removes the even rows, and passes control to a function block 1218. The function block 1218 performs interpolation based on, for example, NEDI-6, and passes control to a function block 1227. The function block 1227 finds the error between the original and reconstructed columns (2), and passes control to the function block 1233.

The function block 1212 removes even rows and columns, and passes control to a function block 1221. The function block 1221 performs interpolation based on, for example, NEDI-8, and passes control to a function block 1230. The function block 1230 finds the error between the original and reconstructed rows/columns (3), and passes control to the function block 1233.

The function block 1233 sets the number (no.) of dropped rows M_d=0, sets the number of dropped columns N_d=0, sets the maximum dropped pixels Pel=0, and passes control to a decision block 1236. The decision block 1236 determines whether or not M_d=0. If so, then control is passed to a function block 1242. Otherwise, control is passed to a decision block 1239.

The function block 1242 chooses to drop the N_d columns with the least error in (1), i.e., the error calculated per function block 1224, and passes control to a function block 1246. The function block 1246 calculates the error MSE and number of dropped pixels Pel, and passes control to a decision block 1252. The decision block 1252 determines whether or not MSE<MSE_max and Pel>Pel_max. If so, then control is passed to a function block 1255. Otherwise, control is passed to a function block 1270.

The function block 1255 sets Pel_max=Pel, sets M_d_opt=M_d, sets Nd_opt=N_d, and passes control to a function block 1258. The function block 1258 determines whether or not N_d<N. If so, then control is passed to a function block 1264. Otherwise, control is passed to a function block 1261.

The function block 1264 sets N_d=N_d+16, and returns control to the decision block 1236.

The function block 1261 determines whether or not M_d<M. If so, then control is passed to a function block 1267. Otherwise, control is passed to a function block 1270.

The decision block 1239 determines whether or not N_d=0. If so, then control is passed to a function block 1245. Otherwise, control is passed to a function block 1249.

The function block 1245 chooses to drop the M_d columns with the least error in (2), i.e., the error calculated per function block 1227, and passes control to the function block 1246.

The function block 1249 chooses to drop the M_d columns and N_d rows with the least error in (3), i.e., the error calculated per function block 1230, and passes control to the function block 1046.

The function block 1270 outputs M_d_opt and N_d_opt, and passes control to an end block 1299.

Figure 13:
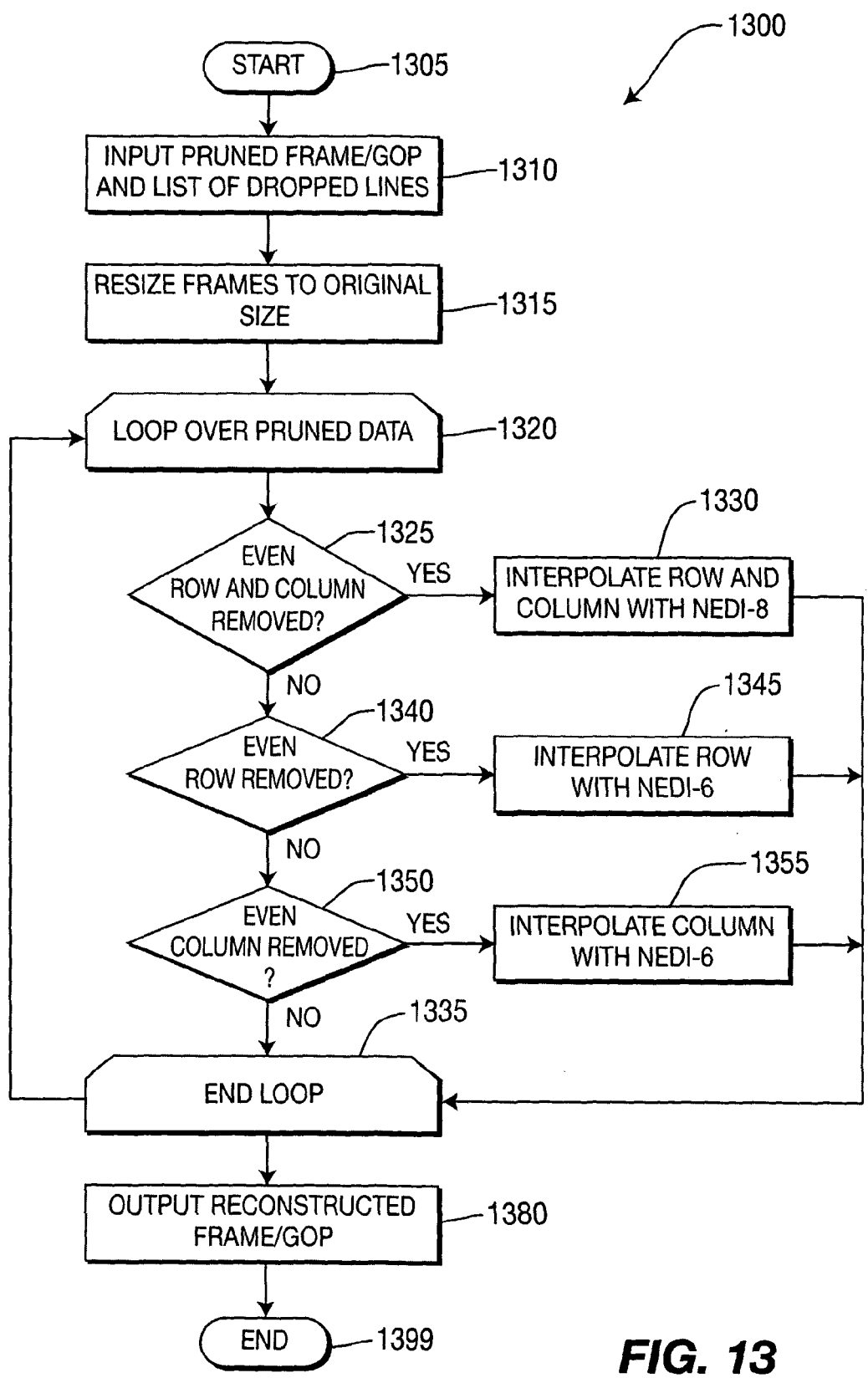
FIG. 13 is a flow diagram showing an exemplary method for optimal data restoring, in accordance with an embodiment of the present principles.

Turning to FIG. 13, an exemplary method for optimal data restoring is indicated generally by the reference numeral 1300. The method 1300 includes a start block 1305 that passes control to a function block 1310. The function block 1310 inputs a pruned frame and/or group of pictures (GOP), and a list of dropped frames, and passes control to a function block 1315. The function block 1315 resizes the frames to their original size, and passes control to a loop limit block 1320. The loop limit block 1320 loops over the pruned data, and passes control to a decision block 1325. The decision block 1325 determines whether or not an even row and column has been removed. If so, then control is passed to a function block 1330. Otherwise, control is passed to a decision block 1340.

The function block 1330 interpolates the row and column with NEDI-8, and passes control to a loop limit block 1335.

The loop limit block 1335 ends the loop, and passes control to a function block 1360. The function block 1360 outputs a reconstructed frame/GOP, and passes control to an end block 1399.

The decision block 1340 determines whether or not an even row has been removed. If so, then control is passed to a function block 1345. Otherwise, control is passed to a decision block 1350.

The function block 1345 interpolates the row with NEDI-6, and passes control to the loop limit block 1335.

The decision block 1350 determines whether or not an even column has been removed. If so, then control is passed to a function block 1355. Otherwise, control is passed to the loop limit block 1335.

The function block 1355 interpolates the column with NEDI-6, and passes control to the loop limit block 1335.

High Order Edge-Directed Interpolation

By interpolation we mean any method that is able to estimate/fill missing pixels from the surrounding pixels of the same or temporally related frames. Such methods can be classical interpolation, like the bi-cubic method, newer methods like NEDI, or other kind of methods like inpainting, which fills holes of missing pixels from their surroundings. Of course, interpolation in accordance with the present principles is not limited to only the preceding described interpolation techniques and, thus, other interpolation techniques may be also be used, while maintaining the spirit of the present principles.

For interpolation at a decoder, we propose to apply a high-order edge-directed interpolation so more directions can be adapted. Our method is different from that described in a prior art approach relating to covariance of the low resolution image, which uses only 4 neighboring pixels and can only be applied for an upsizing ratio of 2×2. We adapt it to be used for the proposed data pruning scheme. In an embodiment, the sixth-order and eighth-order edge-directed interpolation are used for the cases of dropping lines in only one dimension (only rows or only columns) and 2 dimensions (both rows and columns), respectively.

Embodiment:NEDI-6

The algorithm for dropping only columns is discussed because the same algorithm can be applied for the cases of dropping only columns and dropping only rows. First, the columns of P' corresponding to the odd columns in the original frame I are extracted to form the low resolution frame P'$_l$ of size $$M \times \frac{N}{2}.$$

Columns of P'$_l$, are mapped to the odd columns of the HR frame P'$_h$ of size M×N. The even columns of P$_h$ are interpolated from the odd columns by a sixth-order interpolation as explained herein.

Figure 5B:
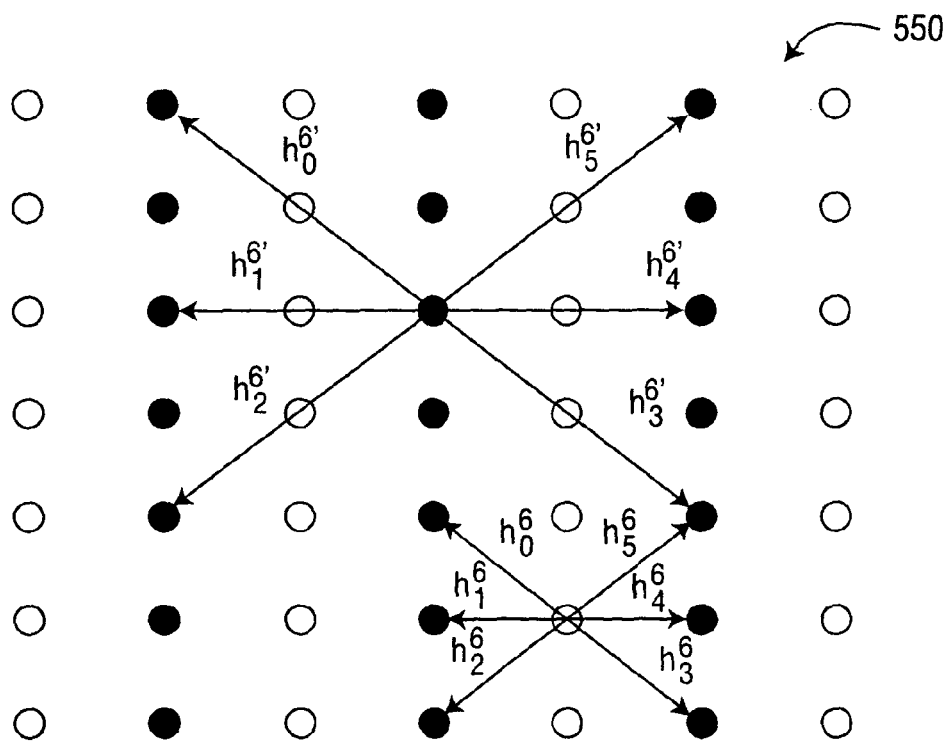
FIG. 5B is a diagram showing model parameters of high-order edge-directed interpolation relating to NEDI-6, in accordance with an embodiment of the present principles.

The interpolated pixel is the summation of the weighted 6-neighbor surrounding pixels as shown in FIG. 5B. Turning to FIG. 5B, model parameters of high-order edge-directed interpolation relating to NEDI-6 are indicated generally by the reference numeral 500. These weights are the model parameters of the high resolution frame. The optimal model parameters are obtained by minimizing the MSE between the interpolated pixels and the original pixels with the assumption that the model parameters are constant in a local window. Applying the geometric duality assumption, the model parameters are considered constant for different scales and can be estimated from the low resolution pixels. As shown in FIG. 5B, the model parameters of the low resolution frame, with the availability of the original pixels and interpolated pixels, can be obtained by minimizing the error between them. These low resolution model parameters are then used as the high resolution model parameters to interpolate the missing high resolution pixels. Finally, the column indicator is used to choose the pixels from the compressed pruned frame or interpolated frame to form the final reconstructed frame. If the column indicator value is 1, then the reconstructed column is taken from the interpolated frame. Otherwise, if the column indicator value is 0, then the reconstructed column is taken from the compressed pruned frame.

Embodiment:NEDI-8

Similar to NEDI-6, the pixels in P' corresponding to the low resolution pixels of the down-sampling ratio 2×2 in the original frame I are extracted to form the LR frame P'$_l$ of size $$\frac{M}{2} \times \frac{N}{2}.$$

The interpolation is performed using NEDI-4 for the first round and NEDI-8 for the second round. With the availability of all 8-neighboring pixels in the second round, NEDI-8 is implemented to get extra information from 4 directions. The advantage of this round is that the model parameters can be directly estimated from its high resolution pixels, so the over-fitting problem of NEDI-4 is lessened. NEDI-8 is applied to all the missing high resolution pixels in order to be consistent. The fourth-order model parameters $h_4$ and eighth-order model parameters $h_8$ for HR scale are shown in FIG. 3A. The optimal $h_8$ is calculated by a similar algorithm to the one employed for NEDI-6.

A description will now be given of some of the many attendant advantages/features of the present invention, some of which have been mentioned above. For example, one advantage/feature is an apparatus having a data pruner for pre-processing a picture prior to, and in preparation for, compression by encoding. The data pruner selectively removes, in the spatial domain, at least one region within the picture.

Another advantage/feature is the apparatus having the data pruner as described above, wherein the data pruner is included in an encoder.

Still another advantage/feature is the apparatus having the data pruner as described above, further comprising an encoder coupled to the data pruner for encoding the picture with the at least one region removed.

Also another advantage/feature is the apparatus having the data pruner as described above, wherein side information indicating a location of the at least one region within the picture is one of explicitly or implicitly transmitted to a decoder or other device.

Yet another advantage/feature is the apparatus having the data pruner as described above, wherein the at least one region includes at least one of a straight line, a non-linear curve, and a region.

Moreover, another advantage/feature is the apparatus having the data pruner as described above, wherein only even or odd lines are removed by the data pruner.

Further, another advantage/feature is the apparatus having the data pruner as described above, wherein the picture is included in a group of pictures, and all pictures within the group of pictures are assigned a same removal pattern.

Also, another advantage/feature is the apparatus having the data pruner as described above, wherein the at least one region selectively removed is determined responsive to an evaluation of at least one of an image distortion metric, a rate distortion metric, a dropped pixel metric, and a complexity metric.

Additionally, another advantage/feature is the apparatus having the data pruner as described above, wherein 6-order interpolation is used for removing the at least one region in one dimension, and 8-order interpolation is used for removing the at least one region in two dimensions.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a data pruner for pre-processing a picture prior to, and in preparation for, compression by encoding, wherein said data pruner selectively removes, based on location of pixels within the spatial domain of the picture, and not on the frequency domain, only portions of said picture comprising at least one region, line or segment comprising arbitrary lines within the picture, and leaving the remaining portions of said picture to be encoded.

2. The apparatus of claim 1, wherein said data pruner is comprised in an encoder.

3. The apparatus of claim 1, further comprising an encoder coupled to said data pruner for encoding the picture with the at least one region removed.

4. The apparatus of claim 1, wherein side information indicating a location of the at least one region within the picture is transmitted to a decoder.

5. The apparatus of claim 1, wherein the at least one region comprises at least one of a straight line, a non-linear curve, and a region.

6. The apparatus of claim 1, wherein only even or odd lines are removed by said data pruner.

7. The apparatus of claim 1, wherein the picture is comprised in a group of pictures, and all pictures within the group of pictures are assigned a same removal pattern.

8. The apparatus of claim 1, wherein the at least one region selectively removed is determined responsive to an evaluation of at least one of an image distortion metric, a rate distortion metric, a dropped pixel metric, and a complexity metric.

9. The apparatus of claim 1, wherein 6-order interpolation is used for removing the at least one region in one dimension, and 8-order interpolation is used for removing the at least one region in two dimensions.

10. A method, comprising:
pre-processing a picture prior to, and in preparation for, compression by encoding, wherein said pre-processing comprises selectively removing, based on location of pixels within the spatial domain of the picture, and not on the frequency domain, only portions of said picture comprising at least one region, line or segment comprising arbitrary lines within the picture, and leaving the remaining portions of said picture to be encoded, using a data pruner having a processor.

11. The method of claim 10, wherein the method is comprised in an encoder.

12. The method of claim 10, further comprising encoding the picture with the at least one region removed.

13. The method of claim 10, wherein side information indicating a location of the at least one region within the picture is transmitted to a decoder.

14. The method of claim 10, wherein the at least one region comprises at least one of a straight line, a non-linear curve, and a region.

15. The method of claim 10, wherein only even or odd lines are removed by said pre-processing.

16. The method of claim 10, wherein the picture is comprised in a group of pictures, and all pictures within the group of pictures are assigned a same removal pattern.

17. The method of claim 10, wherein the at least one region selectively removed is determined responsive to an evaluation of at least one of an image distortion metric, a rate distortion metric, a dropped pixel metric, and a complexity metric.

18. The method of claim 10, wherein 6-order interpolation is used for removing the at least one region in one dimension, and 8-order interpolation is used for removing the at least one region in two dimensions.

19. An apparatus, comprising:
a data restorer for receiving a decompressed picture subsequent to decompression by decoding, and post-processing the decompressed picture by selectively restoring, based on location of pixels within the spatial domain of the picture, and not on the frequency domain, only portions of said picture comprising at least one region, line or segment comprising arbitrary lines within the decompressed picture, from the remaining portions of said picture that was encoded, based on information indicating a removal of the at least one region prior to a previously performed encoding process.

20. The apparatus of claim 19, wherein said data restorer is comprised in a decoder.

21. The apparatus of claim 19, further comprising a decoder coupled to said data restorer for decoding the picture with the at least one region removed.

22. The apparatus of claim 19, wherein said data restorer receives side information indicating a location of the at least one region within the picture is transmitted to a decoder.

23. The apparatus of claim 19, wherein the at least one region comprises at least one of a straight line, a non-linear curve, and a region.

24. The apparatus of claim 19, wherein only even or odd lines are restored by said data restorer.

25. The apparatus of claim 19, wherein the picture is comprised in a group of pictures, and all pictures within the group of pictures are assigned a same removal pattern.

26. The apparatus of claim 19, wherein 6-order interpolation is used for restoring the at least one region in one dimension, and 8-order interpolation is used for restoring the at least one region in two dimensions.

27. A method, comprising:
receiving a decompressed picture subsequent to decompression by decoding; and
post-processing, using a data restorer having a processor, the decompressed picture by selectively restoring, based on location of pixels within the spatial domain of the picture, and not on the frequency domain, only portions of said picture comprising at least one region, line or segment comprising arbitrary lines within the decompressed picture, from the remaining portions of said picture that was encoded, based on information indicating a removal of the at least one region prior to a previously performed encoding process.

28. The method of claim 27, wherein the method is comprised in a decoder.

29. The method of claim 27, further comprising decoding the picture with the at least one region removed prior to said receiving.

30. The method of claim 27, wherein said data restorer receives side information indicating a location of the at least one region within the picture is transmitted to a decoder.

31. The method of claim 27, wherein the at least one region comprises at least one of a straight line, a non-linear curve, and a region.

32. The method of claim 27, wherein only even or odd lines are restored by said post-processing.

33. The method of claim 27, wherein the picture is comprised in a group of pictures, and all pictures within the group of pictures are assigned a same removal pattern.

34. The method of claim 27, wherein 6-order interpolation is used for restoring the at least one region in one dimension, and 8-order interpolation is used for restoring the at least one region in two dimensions.

35. A non-transitory computer readable media having video signal data encoded thereupon, comprising:
an encoded picture pre-processed prior to compression by encoding, wherein the picture is pre-processed to selectively remove, based on location of pixels within the spatial domain of the picture, and not on the frequency domain, only portions of said picture comprising, at least one region, line or segment comprising arbitrary lines within the picture, and leaving the remaining portion of said picture to be encoded.

* * * * *